United States Patent [19] [11] 4,045,396
Marans et al. [45] Aug. 30, 1977

[54] FLAME RETARDANT PERMANENT PRESS

[75] Inventors: Nelson Samuel Marans; Alfred Gluecksmann, both of Silver Spring, Md.

[73] Assignee: W. R. Grace & Co., New York, N.Y.

[21] Appl. No.: 733,983

[22] Filed: Oct. 20, 1976

Related U.S. Application Data

[63] Continuation-in-part of Ser. No. 619,537, Oct. 3, 1975, abandoned.

[51] Int. Cl.² .............. C08K 3/00; C08G 18/84; B32B 27/40; D06M 15/12
[52] U.S. Cl. .............. 260/29.2 TN; 8/116 P; 8/187; 8/192; 260/32.8 N; 260/77.5 A; 260/77.5 AR; 260/77.5 AM; 260/DIG. 24; 427/385 R; 427/394
[58] Field of Search .............. 260/77.5 AM, 29.2 TN, 260/77.5 A, 77.5 AR

[56] References Cited

U.S. PATENT DOCUMENTS

| | | | |
|---|---|---|---|
| 2,691,566 | 10/1954 | Kvalnes | 8/192 |
| 3,384,606 | 5/1968 | Dieterich et al. | 260/77.5 A |
| 3,427,272 | 2/1969 | Bolinger et al. | 260/77.5 A |
| 3,462,237 | 8/1969 | Sellet | 260/29.2 TN |
| 3,492,081 | 1/1970 | Morak | 8/192 |
| 3,627,719 | 12/1971 | Sellet | 260/29.2 TN |
| 3,900,665 | 8/1975 | Weil | 8/116 P |

*Primary Examiner*—H.S. Cockeram
*Attorney, Agent, or Firm*—Richard P. Plunkett; William W. McDowell, Jr.

[57] ABSTRACT

Fire retardancy and wrinkle resistance are imparted to cellulosic textiles by impregnation of said textiles with the phosphoalkylated reaction product of a polyisocyanate and an alkyleneamine.

3 Claims, No Drawings

FLAME RETARDANT PERMANENT PRESS

This application is a continuation-in-part of our copending application having Ser. No. 619,537, filed Oct. 3, 1975, now abandoned.

BACKGROUND OF THE INVENTION

1. Prior Art

Guth in U.S. Pat. No. 3,421,923 and Reeves et al in U.S. Pat. No. 2,809,941 disclose that flame retardant properties may be imparted to cellulosic textile materials by treatment with phosphorus containing compounds. In addition, it is also known that introduction of a phosphorus containing flame retardant in a nitrogen containing compound results in a synergistic flame retardant effect as described in Tesoro et al, Textile Research Journal, 1969, pp. 180–190 as well as Beninate et al., American Dyestuff Reporter, Dec. 2, 1968, pp. 77–77. The prior art predominantly illustrates utilization of the supra synergism by describing flame retardant compounds comprising contacting N-methyl urea, melamine etc. with tri hydroxymethyl phosphine i.e. $(HO-CH_2)_3P$ and tetrakis (hydroxymethyl) phosphonium halides i.e. $(HO-CH_2)_4-P-X$ where X usually consists of Cl or Br. U.S. Pat. No. 2,995,551 and U.S. Pat. No. 2,831,838 respectively describe these processes. The textile materials are impregnated usually with aqueous solutions containing the organic nitrogeneous-phosphorus compounds, dried and then subjected to conditions which insolubilize the flame retardant in situ.

Another desirable characteristic to be imparted to cellulosic textile materials especially those used in the manufacture of wearing apparel is wrinkle resistance. The prior art has concentrated on the use of thermosettable polymers for the obtention of such so-called permanent press effects and U.S. Pat. No. 3,639,157 discloses a typical method designed to improve the crease resistance of textile materials by coating said materials with a polyurethane.

In the prior art however, in order to obtain both flame retardance and wrinkle resistance, the textile material was usually treated successively with a flame retardant and then with a compound capable of imparting wrinkle resistant properties. A single treatment process to impart both flame retardancy and wrinkle resistance has become the object of considerable research in the art.

2. Objects of the Invention

An object of the present invention is to provide an improved method for treating cellulosic textile materials whereby single treatment with a single compound imparts a high degree of both flame retardancy and wrinkle resistance.

It is a further object of the invention to provide a method of imparting simultaneously flame retardant and wrinkle resistance characteristics to cellulosic materials without significantly increasing the fabric's stiffness. Other objects will become apparent as the description of the invention proceeds.

BRIEF DESCRIPTION OF THE INVENTION

The present invention provides a method of imparting simultaneously flame retardant and wrinkle resistance characteristics to cellulosic materials by impregnating said materials with the phosphoalkylated reaction product of a polyisocyanate and an alkylene amine.

The polyiisocyanate, which is the reaction product of polyethylene glycol and an aryl isocyanate, e.g. tolylene diisocyanate, is treated with diethylene triamine of triethylene tetramine in ketone solution, followed by removal of the ketone, then phosphoalkylation either by addition of phosphorous trichloride, water and aldehyde or with phosphorous acid and then aldehyde. Cellulosic fabric is then dipped into the water soluble reaction product preferably in the presence of formaldehyde or other conventional crosslinking agents, such as 1,4-dichloro-2-butene; 1,4-dibromo-2-butene; and epichlorohydrin, allowed to soak and then heated. The resulting fabric has excellent wrinkle resistance and flame retardant properties.

DETAILED DESCRIPTION OF THE INVENTION

The desirability of rendering textile fabrics resistant to fire is evident. Bedding, upholstery and drapery fabrics are of particular interest in this regard, but the advantages of fire-proofing wearing apparel likewise are manifest.

In accordance with the terminology which has been developed in this field "fire retardancy" results from the treatment of a substrate such as a textile fabric with various chemicals so that it becomes resistant to the propagation of flame across its surface after the igniting flame has been removed.

The treated textile fabrics of the present invention have a high degree of fire retardancy but the same compound responsible for the attribution of said retardancy acts also as a wrinkle resistance agent.

In the past polyurethanes have been used to impart wrinkle resistance to textiles and phosphorus containing nitrogen compounds have found application in the imparting of flame retardancy to textiles.

It was discovered in the present invention that when cellulosic textile materials are treated with a polyurethane, into which phosphorus has been incorporated via phosphoalkylation of the intermediate polyisocyanate alkyleneamine reaction product, both flame retardant and wrinkle resistance properties are imparted to said cellulosic textile materials. Although aryl isocyanates have been used, better color retention is found with alkyl isocyanates. When color fastness is required, the alkyl isocyanates can be employed.

Although the exact reaction mechanism is not fully understood, the following set of reactions is believed to lead to the reaction product which imparts these flame retardant and wrinkle resistant properties to cellulosic textile materials.

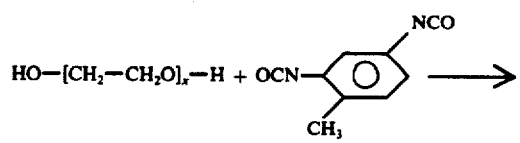

[A]   [B]

-continued

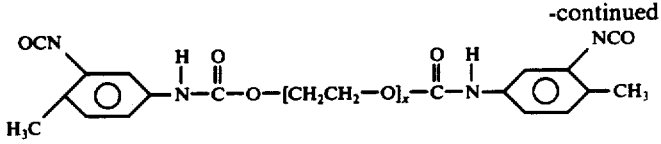

This reaction is conducted from 20° C to 100° C and at atmospheric pressure over a period of 5–300 minutes.

Step II - Polyamine preparation

The unreacted isocyanate end groups are reacted with an alkylene amine in ketone solution (the solution is formed from 0 to 50° C from 5 minutes - 1200 minutes) which gives a controllable reaction:

where R contains an $-NH_2$ end group. The ketone solvent is then removed.

Step III - Phosphoalkylation of the polyamine

Utilizing the amine functionalities available, phosphoalkylation of the supra polyamine is accomplished by formation of nitrilo methylene phosphonic acid as follows:

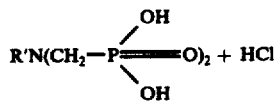

where R' may optionally have additional —NH— and/or $-NH_2$ groups. The phosphoalkylation reaction is conducted at 20° to 90° C for 5–600 minutes at ambient pressure. Step IV The aqueous solution of this compound is then reacted with an added crosslinking agent at temperatures from 25° to 80° C. The crosslinking reaction may be accomplished by a variety of crosslinking agents using residual N-H groups from the amine functionality:

(a) 

(b) 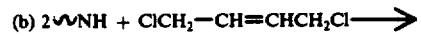

(c) 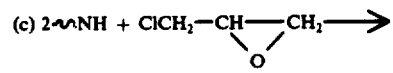

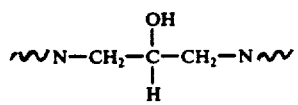

The aldehyde used for crosslinking may be incorporated during Step III by using excess aldehyde over that required for the phosphoalkylation reaction.

This therefore is how it is believed the set of reactions underlying the present invention takes course.

Reactant A in step I is a polyethylene glycol of molecular weight between 400 and 6,000.

Reactant B in step I is in isomeric mixture of 2,4 and 2,6 tolylene diisocyanate.

The alkylene amine used in step II is selected from the group comprising of diethylene triamine and triethylene tetramine.

In practice, after the polyethylene glycol is capped with the diisocyanate, it is treated with a ketone solution of an alkyleneamine to give the desired polyamine. The ketone used herein to react with the alkyleneamine is one that boils below 120° C and includes acetone, methyl ethyl ketone, diethyl ketone, methyl propyl ketone, methyl isopropyl ketone, methyl isobutyl ketone and the like. The mole ratio of ketone to alkyleneamine is in the range of 2.5-15.0:1 respectively. The ketone is removed from the reaction product prior to the phosphoalkylation step by conventional means such as distillation or solvent extraction. After displacing the ketone by conventional means, e.g. distillation, the final water soluble product is then phosphoalkylated either by addition of $PCl_3$, $H_2O$ and an aldehyde containing 1 to 6 carbon atoms, e.g. $CH_2O$ or with $H_3PO_3$ and then an aldehyde under acidic conditions, i.e. at pH of 2.0. The pH of the reaction liquors is preferably adjusted before textile treatment since the formation of hydrochloric acid during the phosphoalkylation results in a highly acidic system which will have a detrimental effect on the fabric's tear strength. Cotton fabric is dipped into the reaction liquor with formaldehyde or other typical crosslinking agents, e.g. 1,4-dichloro-2-butene present at pH of 3 to 10. The soaked fabric is then heat-cured and becomes thus the wrinkle resistant, flame retarded cellulosic textile material which is the object of the present invention.

For crosslinking, conventional crosslinking agents employed to crosslink urea and amine groups are operable herein. Such agents include, but are not limited to, aldehydes containing 1 to 6 carbon atoms such as formaldehyde, acetaldehyde, propionaldehyde, isobutyraldehyde, butyraldehyde, valeraldehyde, hexanal, 2-methylvaleraldehyde and the like. Said aldehydes are conventionally used to crosslink both urea and amine groups. For crosslinking amine groups herein, aliphatic halides containing 3 to 10 carbon atoms, such as epichlorohydrin and alkyl or alkylaryl halides containing 3 to 10 carbon atoms including but not limited to 1,4-dichloro-2-butene; 1,4-dibromo-2-butene; 1 chloro, 4 bromo, 2-butene; 1,6-dichloro 2,4-hexadiene; 1,6-dibromo, 2,4-hexadiene; 2,3-dibromopropene; α,α'-dibromo-o-xylene; α,α'-dibromo-m-xylene; α,α'-dibromo-p-xylene; 1,3-dichloro-2-butene; 1,3-dibromo-2-butene; 3,4-dichloro-1-butene; 2,3-dichloro-1-propene; α,α'-dichloro-o-xylene; α,α'-dichloro-m-xylene; α,α'-dichloro-p-xylene and the like, are employed. The allylic halides are preferred because of ease of reaction.

The crosslinking reaction is initiated by heat. Heating in the range 100° to 150° C for periods ranging from about one-half hour at the lower temperature of the range to about 15 seconds at the upper temperature range results in a crosslinked product.

The mole ratios of reactants may be varied between broad limits and the operable levels are as follows. The mole ratio of toluene-diisocyanate to polyethylene glycol may range from 1.5 to 2.5, the mole ratio of diethylenetriamine or triethylenetetraamine to polyethylene glycol from 1.5 to 4.0. The mole ratio of aldehyde to diethylenetriamine may be varied from 4.5–10.0 with the mole ratio of phosphorous acid or phosphorous trichloride to diethylenetriamine being 4.5–7.0. For the triethylene tetraamine the mole ratio of aldehyde to the polyamine is 6.5–10.0 and of phosphorous acid or phosphorous trichloride to the polyamine of 6.5–9.0. The crosslinking agent is in the range of 0.5–4.0 moles to 1 mole of the alkyleneamine.

EXAMPLE 1

A. Diethylene triamine and anhydrous acetone are mixed in a mole ratio of 1.0 to 6.75 respectively at 25° C for 24.0 hours. The resulting product is designated as (A).

B. Polyethylene glycol of molecular weight 600 and a mixture of 2,4- and 2,6- tolylene diisocyanate are allowed to react by addition of over a period of 45 minutes of the glycol to the diisocyanate held at a temperature between 30° and 60° C. The mole ratio of the glycol to the diisocyanate is 1 to 2 respectively. The resulting product is designated as (B).

C. (A) is charged to a flask and upon vigorous stirring and cooling to maintain temperature below 10° C (B) is added to it over a period 35 minutes. The mole ratio of A to B is 2 to 1 respectively. The resulting product is designated as (C).

D. Acetone is removed from reaction product (C) by distillation. To 98.5 g of the above prepared polyamine, 200 c.c. of distilled water is added followed by the gradual addition upon cooling to maintain temperature below 30° C over a period of 10 minutes, of $PCl_3$ which in turn is followed by the gradual addition over a period of 5.0 minutes of a 37% solution of $CH_2O$.

A sodium hydroxide solution containing 3 moles of NaOH per mole of $PCl_3$ is used to trap the HCl which evolves in the course of the $PCl_3$ addition. The reaction mixture is then heated up to 65° C and held at that temperature for 2¼ hours.

The molar ratio of $PCl_3$ to $CH_2O$ to reaction product (C) is respectively 6.0:6.0:1.0.

EXAMPLE 2

The same procedure is followed as in Example 1 with the exception that as alkylene amine, triethylene tetramine is used and thus the mole ratio of said amine to anhydrous acetone is 1.0 to 13.5 and the molar ratio of $PCl_3$ to $CH_2O$ to the reaction product analogous to (C) in Example 1 is respectively 8.0:8.0:1.0.

EXAMPLE 3

After bringing the pH of the final reaction product of example 1 up to about 5.0 with a solution of HaOH, 15 drops of 37% formaldehyde are added to 23.2 g of the above product. A minor portion of the thus formed mixture was placed on a watch glass and heated at 150° C for 30 minutes to evaporate the water. A crosslinked self-supporting film of polymer resulted. A cotton cloth sample is allowed to soak in the remaining portion of the mixture for 3.0 minutes followed by drying of said sample at 100° C for 10 minutes in a vacuum oven.

Flame testing reveals that the sample thus treated will not support combustion when removed from the hottest part of a Bunsen burner flame. Also within said flame the sample will char but will not visibly burn away as is the case with an identical untreated sample; the untreated samples will ignite within 8 seconds when held 2¼ inches above flame's tip; the treated sample will not ignite and only after 20 seconds will it start to gradually turn black.

The approximate % add-on after cure is between 15 and 35%.

The wrinkle resistance characteristic is as expected equivalent to that of clothes conventionally polyurethane treated for that purpose.

EXAMPLE 4

In this example samples of cotton cloth were allowed to soak in the reaction product prepared as described in Example 2, identical qualitative and quantitative evaluation techniques were used as outlined in Example 3 and as expected no significant differences were noted with regards to the flame retardance and wrinkle resistance characteristics as compared to those of Example 3.

EXAMPLE 5

The reaction product from Example 2, 0.294 mole based on the amount of triethylenetetraamine, was treated with an aqueous solution of 6.0 N NaOH to give a pH = 5.0. To this solution there was added 1.0 mole of 1,4-dichloro-2-butene. The resultant mixture was used to impregnate cotton and the impregnated cotton was heated for 30 minutes at 100° C. The cotton sample did not support combustion.

WE CLAIM:

1. A composition designed to impart simultaneously wrinkle resistance and flame retardant properties to cellulosic textile materials which comprises the products obtained by reacting (A) a polyoxyalkylene polyol with (B) an aryl or alkyl diisocyanate to obtain a polyoxyalkylene capped diisocyanate which is then reacted with (C) a ketone solution of an alkyleneamine selected from diethylene triamine and triethylene tetramine to obtain a polyamine product, removing the ketone and further reacting the polyamine product with (D) a phosphorous compound selected from phosphorous acid and phosphorous trichloride, and (E) aqueous aldehyde containing 1 to 6 carbon atoms to obtain a phosphoalkylated amine-containing product, the mole ratio of components (A) to (B) to (C) being in the range of 1.0 of (A) to 1.5–2.5 of (B) to 1.5–4.0 of (C) and the mole ratio of (E) to (C) to (D) being in the range of 4.5–10.0 of (E) to 1.0 of (C) to 4.5–7.0 of (D) when (C) is diethylene triamine and 6.5–10.0 of (E) to 1.0 of (C) to 6.5–9.0 of (D) when (C) is triethylene tetramine.

2. The composition according to claim 1 including (F), a crosslinking agent for the phosphoalkylated, -amine-containing product from the group consisting of an aldehyde containing 1 to 6 carbon atoms and an aliphatic halide containing 3 to 10 carbon atoms, the mole ratio of (F) to (C) being in the range of 0.5–4.0 of (F) to 1.0 of (C).

3. A crosslinked polymer obtained from the composition of claim 2.

* * * * *